(No Model.) 2 Sheets—Sheet 1.
C. HESSE.
COMBINED CULTIVATOR AND HARROW.
No. 417,421. Patented Dec. 17, 1889.
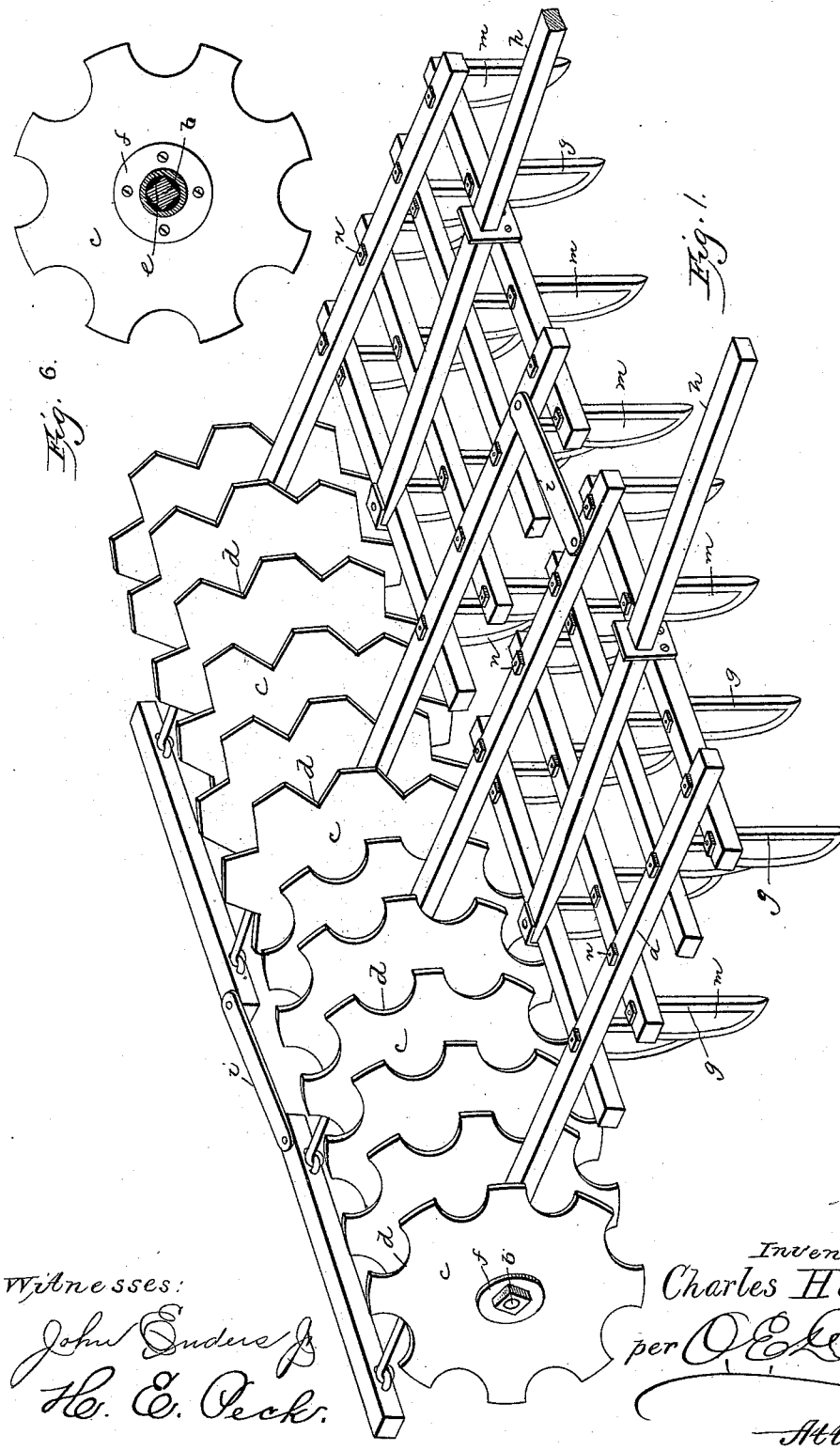
Witnesses:
John Enders Jr.
H. E. Peck.
Inventor:
Charles Hesse,
per O. E. Duffy
Attorney

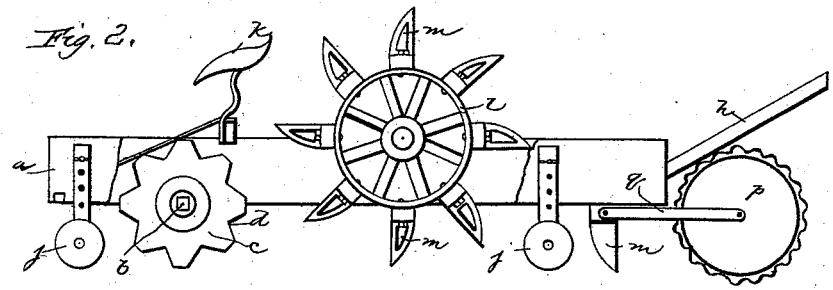

United States Patent Office.

CHARLES HESSE, OF DANVILLE, ILLINOIS.

COMBINED CULTIVATOR AND HARROW.

SPECIFICATION forming part of Letters Patent No. 417,421, dated December 17, 1889.

Application filed March 19, 1889. Serial No. 303,899. (No model.)

*To all whom it may concern:*

Be it known that I, CHARLES HESSE, of Danville, in the county of Vermilion and State of Illinois, have invented certain new and useful Improvements in a Combined Cutter, Cultivator, and Harrow; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in harrows and cultivators; and the invention consists in certain novel features of construction and combinations of parts, more fully described hereinafter, and particularly pointed out in the claims.

Referring to the accompanying drawings, Figure 1 is a perspective view of the machine. Fig. 2 is a side elevation of a differently-constructed machine embodying my invention. Fig. 3 is a top plan of the same. Fig. 4 is a perspective view of the roller or wheel. Fig. 5 is a cross-section of the same. Fig. 6 is a cross-section on line $x\ x$, Fig. 3. Fig. 7 is a detail perspective view of one of the sleeves or collars by which the cutting-disks are secured to their shaft. Fig. 8 is a longitudinal section of a tooth, and Fig. 9 is a cross-section of the same. Fig. 10 is a detached perspective view of a knife-blade or cutter.

In the drawings, the reference-letter $a$ indicates the frame of the machine, composed of a suitable number of cross and side beams, as shown.

The construction shown in Fig. 1 consists of a pair of harrow-cultivators secured together, and each consisting of a series of revolving cutting-disks located in advance of a series of peculiar cultivating-teeth. A shaft $b$ is journaled in suitable bearings on the side beams of the frame and extends across the front portion of the frame. On this axle a series of disks or cutting-wheels $c$ are mounted a suitable distance apart, and the peripheries of these disks are notched or recessed, as shown at $d$, to increase the cutting-surface of the same, and the edges of the arms or projections formed by said recesses are provided with cutting-edges, as also are the peripheries of the disks. The axle $b$ is preferably squared, and each disk is mounted upon the same by means of a sleeve or collar $e$, provided with a set-screw $b$, to engage the shaft and with an annular projecting flange $f$, fitting against the side of a disk and riveted or bolted to the same. Thus it will be seen that as the machine is drawn forward the disks engage the ground and are thereby rotated, the projections extending into the earth and the edges cutting the sod or any cornstalks or other substance that would interfere with the cultivator.

To the rear of the cutting-disks the frame is provided with a series of cross-beams, to which a series of rigid straight downwardly-extending knives $m$ are secured. Each knife is provided with an upwardly-extending threaded bolt $n$, which extends through a cross-beam and is provided with a nut on its upper end. The rear edge of the knife is preferably straight, while its front side tapers down to a point and its front edge is sharpened. These knives are provided with an upwardly-extending cutting-edge or one or more sharp projections $a'$ on their upper edges, as shown in Fig. 10, so that when the nuts on the bolts $n$ are screwed up tight the edge or projection $a$ will be drawn into the wood of the beam to which the knife is secured, and thereby tightly and rigidly hold the same from turning or twisting. The knives are formed integral and their sides are hollowed out, as shown by the sections in Figs. 8 and 9, leaving ribs $g$ on the sides of the same around the edges, so that as the knives pass through the ground the earth will be caught by the ribs and turned outwardly, thereby cutting what might be termed a "furrow." It will be observed that the disks cut the sod and hard earth, and the knives following the same further pulverize, turn, and cut the earth.

Each harrow-cultivator is provided with a rearwardly-extending handle $h$, by which it can be guided and lifted, and where two or more cultivators are used in combination they are loosely connected together by pivoted links $i$, and at their front ends are provided with whiffletrees, to which the horse or horses are attached.

The construction shown in Figs. 2, 3, 4, and 5 is provided with a rectangular frame mounted at the corners upon suitable caster-wheels $j$, carried by adjustable standards. A suitable seat $k$ is mounted in the forward part of the frame upon a cross-piece. A shaft $b$ is journaled in suitable boxes secured to the side beams of the frame at the front end of the same, and upon this shaft the series of cutting-disks $c$ are mounted, as before described in connection with the construction shown in Figs. 1 and 6.

Directly to the rear of the cutting-disks and at about the center of the machine a horizontal rotary cylinder $l$ is journaled in boxes carried by the side beams. This cylinder is composed of circular end pieces connected by longitudinal strips, each strip having a series of cutting and pulverizing knives $m$, secured thereto and projecting radially from the periphery of the cylinder, so that their ends will enter the ground and cause the cylinder to revolve as the machine is drawn forward, and the knives are so placed on the cylinder that their sharpened edges will strike the ground first as the cylinder revolves, and thereby cut and pulverize the same more thoroughly than where the knives are stationarily carried and move with the machine, for the revolution of the cylinder causes the knives to strike the ground with considerable force. The knives are so arranged upon the periphery of the cylinder that, as far as possible, they do not revolve in the same paths. These knives $m$ are constructed as before described.

One or more cross-beams $o$ extend across the rear end of the frame to the rear of the pulverizing-cylinder $l$, and are provided with a series of the knives $m$, secured to and extending downwardly from the same to engage the ground and further turn over and cultivate the same after being operated upon by the cutting-disks and pulverizing and cutting cylinder.

When necessary, the cultivating-harrow can be provided with a leveling and crushing roller $p$, detachably secured to the rear end of the same by means of links $q$, loosely secured to the axle of the roller and pivoted to the end of the frame. This roller is composed of circular end pieces, a periphery of heavy corrugated perforated sheet metal, as shown, and a steel axle extending through the roller. The perforations in the periphery of the roller are of a suitable size and located a suitable distance apart and greatly assist in breaking and pulverizing all hard lumps. This roller is not very heavy, yet it crushes clods, &c., that the knives and disks do not cut, and levels the surface of the ground, leaving it in a splendid condition for planting and drilling, and the roller can be readily attached or detached by means of the detachable connections between the links $q$ and the frame.

This machine can be provided with a handle or lever $h$ for assistance in turning corners, &c. The depth to which the earth is cultivated by the knives and disks can be regulated by the caster-wheels and their standards.

The great utility and advantages of this construction are obvious. The ground and sod are cut, pulverized, cultivated, &c., by one machine.

The draft upon the horses is very light, as the principal parts revolve as the machine moves forward, and thereby does not drag upon the animals.

The parts of the machine are interchangeable. For instance, the stationary cutters and their holders or beams of Fig. 1 can be removed and the rotary cultivator of Fig. 4 substituted therefor; or the form of Fig. 1 can be provided with a detachable pulverizing-roller $p$, the roller being shown detachably secured to the machine in Fig. 3; or the machine of Fig. 1 can be provided with the detachable regulating-casters $j'$.

It is evident that various changes and modifications might be made in the form and arrangement of the parts described without departing from the spirit and scope of my invention; hence I do not wish to limit myself to the precise construction herein set forth.

Having thus fully described my invention, what I claim, and desire to secure by Letters Patent, is—

1. The herein-described cutting-knife formed integral with an upwardly-extended threaded bolt, and having a straight rear edge and tapering downwardly at its front sharpened edge to a point, the sides of said knife being hollowed out and thereby forming side ribs around the edges of the same to catch, throw outwardly, and turn the earth, substantially as described.

2. The combination, with the harrow and cultivator and the frame thereof, of a crushing and pulverizing roller connected with said frame and consisting of end pieces, and a rolling periphery formed of perforated and longitudinally-corrugated sheet metal secured to the ends, substantially as described.

3. In a harrow and cultivator, the combination of the frame, a horizontal rotary shaft mounted in the front of the same, a series of flat rotary cutting-wheels secured to the shaft and having their peripheries recessed and sharpened, one or more cross-bars carried by the frame in rear of said wheels, and a series of straight cutting and cultivating knives carried by said bar, said knives being sharpened at their front edges and having side ribs around their edges to catch and turn the earth, substantially as described.

4. In a cultivator and harrow, the combination of a rectangular frame, vertically-adjustable casters supporting the frame, a horizontal shaft mounted in the front end of the frame, a series of rotary cutting-wheels mounted thereon, a rotary cutting or hoeing cylinder mounted in the frame in rear of said wheels and consisting of a series of longitudinal bars carrying series of radial cutting-knives, a cross-bar in rear of said cylinder, a series of downwardly-extending sharpened cultivating-knives carried by the same, a pulverizing-roller in rear of the frame, and links loosely securing the same to the end of the frame, substantially as described.

In testimony that I claim the foregoing as my own I affix my signature in presence of two witnesses.

CHARLES HESSE.

Witnesses:
O. E. DUFFY,
C. M. WERLE.